US010283771B2

(12) United States Patent
Lee et al.

(10) Patent No.: US 10,283,771 B2
(45) Date of Patent: May 7, 2019

(54) POSITIVE ACTIVE MATERIALS FOR RECHARGEABLE LITHIUM BATTERY, POSITIVE ELECTRODE INCLUDING SAME AND RECHARGEABLE LITHIUM BATTERY (71) Applicant: SAMSUNG SDI CO., LTD., Yongin-si, Gyeonggi-do (KR)

(72) Inventors: Eun-Sung Lee, Yongin-si (KR); Jay-Hyok Song, Yongin-si (KR); Sol Choi, Yongin-si (KR); Do-Hyung Park, Yongin-si (KR); Il-Seok Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 193 days.

(21) Appl. No.: 15/349,939

(22) Filed: Nov. 11, 2016

(65) Prior Publication Data
US 2017/0141393 A1 May 18, 2017

(30) Foreign Application Priority Data
Nov. 12, 2015 (KR) .................. 10-2015-0159087

(51) Int. Cl.
*H01M 4/525* (2010.01)
*H01M 4/505* (2010.01)
*H01M 10/0525* (2010.01)
*H01M 4/02* (2006.01)

(52) U.S. Cl.
CPC .......... *H01M 4/525* (2013.01); *H01M 4/505* (2013.01); *H01M 10/0525* (2013.01); *H01M 2004/028* (2013.01); *H01M 2220/20* (2013.01); *Y02E 60/122* (2013.01)

(58) Field of Classification Search
CPC ...... H01M 4/525; H01M 4/505; H01M 4/364; H01M 4/131; H01M 2004/028
USPC .................................................. 429/223, 224
See application file for complete search history.

(56) References Cited

U.S. PATENT DOCUMENTS

| 6,677,082 | B2 | 1/2004 | Thackeray et al. | |
| 6,964,828 | B2 | 11/2005 | Lu et al. | |
| 8,076,026 | B2 * | 12/2011 | Muthu | H01M 4/131 |
| | | | | 429/212 |
| 8,518,582 | B2 * | 8/2013 | Park | H01B 1/08 |
| | | | | 429/223 |
| 9,583,790 | B2 * | 2/2017 | Park | H01M 10/0568 |

(Continued)

FOREIGN PATENT DOCUMENTS

| KR | 10-2012-0098591 A | 9/2012 |
| KR | 10-2013-0128505 A | 11/2013 |
| KR | 10-2014-0071945 A | 6/2014 |

OTHER PUBLICATIONS

Machine translation of JP 2006-0192229(no date).*
(Continued)

*Primary Examiner* — Amanda C. Walke
(74) *Attorney, Agent, or Firm* — Knobbe, Martens, Olson & Bear LLP

(57) ABSTRACT

A positive active material includes a compound represented by Chemical Formula 1, and the positive electrode including a positive active material and a rechargeable lithium battery including the same are provided.

$$Li_{(1.33-0.67x-z)}Mn_{(0.67-0.33x-0.5y)}Ni_{(x-0.5y+z)}M_{(y)}O_2 \quad \text{[Chemical Formula 1]}$$

Definitions of Chemical Formula 1 are the same as in the detailed description.

19 Claims, 5 Drawing Sheets

(56) References Cited

U.S. PATENT DOCUMENTS

| | | | |
|---|---|---|---|
| 2002/0192552 A1* | 12/2002 | Lampe-Onnerud | H01M 4/366 |
| | | | 429/223 |
| 2014/0154591 A1 | 6/2014 | Yokosuji et al. | |
| 2014/0186672 A1* | 7/2014 | Kwon | H01M 4/75 |
| | | | 429/94 |
| 2015/0050522 A1 | 2/2015 | Manthiram et al. | |
| 2015/0188121 A1* | 7/2015 | Lee | H01M 4/131 |
| | | | 429/224 |
| 2016/0087311 A1* | 3/2016 | Doelle | H01M 4/364 |
| | | | 429/163 |
| 2016/0164057 A1* | 6/2016 | Arora | H01M 2/145 |
| | | | 429/163 |
| 2017/0077503 A1* | 3/2017 | Erickson | H01M 10/0525 |
| 2017/0200979 A1* | 7/2017 | Kwon | H01M 2/0202 |
| 2018/0108940 A1* | 4/2018 | Kwon | H01M 4/131 |

OTHER PUBLICATIONS

Son et al, "Preparation and Characterization of Li1.05[Ni0.35Co0.25Mn0.4]O2 as a Cathode Material for Rechargeable Lithium Cells", Electtochemical and Solid-State Letts, 9(1) A27-A30 (2006).*

* cited by examiner

POSITIVE ACTIVE MATERIALS FOR RECHARGEABLE LITHIUM BATTERY, POSITIVE ELECTRODE INCLUDING SAME AND RECHARGEABLE LITHIUM BATTERY

RELATED APPLICATIONS

This application claims priority to and the benefit of Korean Patent Application No. 10-2015-0159087 filed in the Korean Intellectual Property Office on Nov. 12, 2015, the entire contents of which are incorporated herein by reference

BACKGROUND

Field

A positive active material for a rechargeable lithium battery, a positive electrode including the same, and a rechargeable lithium battery are disclosed.

Description of the Related Art

Recently, rechargeable lithium batteries have been drawing a lot of attention as power sources for portable small electronic devices which have advantageous characteristics of high-capacity and lightness and thus, are used for almost all cordless devices. Rechargeable lithium batteries are used for portable phones, laptops and the like and also, cordless tools such as an electric drills and the like.

In general, rechargeable lithium batteries are manufactured by inserting an electrode assembly along with an electrolyte solution into a battery case and sealing the top opening of the battery case with a sealing member, and the electrode assembly includes a negative electrode including a negative active material, a positive electrode including a positive active material, a separator, and the like.

The positive active material for a rechargeable lithium battery is a constituent element capable of determining energy density and output density of the rechargeable lithium battery. Lithium cobalt oxide ($LiCoO_2$) is used as a positive active material for a rechargeable lithium battery as a power source for a portable electronic device but has not been applied yet to a high energy rechargeable lithium battery for an electric vehicle due to structural/thermal stability, high price, and toxicity. Accordingly, an alternative positive active material replacing the $LiCoO_2$ has been much researched/developed, and as a result, $LiNi_{1/3}Mn_{1/3}Co_{1/3}O_2$, $LiNi_{0.8}Co_{0.15}Al_{0.05}O_2$, $LiMn_2O_4$, $LiFePO_4$, and the like are currently used as a positive active material for the electric vehicle batteries. However, these positive active materials have capacity of less than or equal to about 200 mAh/g and do not satisfy energy density required of the electric vehicle.

Accordingly, development of a positive active material having higher capacity than the conventional positive active materials has drawn interest, and recently, a Li-rich layered oxide has been actively researched for commercial availability as the positive active material for an electric vehicle due to an advantage of high capacity of greater than or equal to about 250 mAh/g and price.

The commercial availability of the Li-rich layered oxide may be accomplished by improving various characteristics occurring during a cycle life such as a voltage decrease phenomenon, energy density per volume, a cycle-life, and the like. The voltage decrease phenomenon occurring during the cycle-life should be solved for the commercial availability of the Li-rich layered oxide.

SUMMARY

One embodiment provides a positive active material for a rechargeable lithium battery being capable of improving a voltage decrease phenomenon.

Another embodiment provides a positive electrode including the positive active material.

Yet another embodiment provides a rechargeable lithium battery including the positive electrode.

One embodiment provides a positive active material including a compound represented by Chemical Formula 1.

[Chemical Formula 1]

In Chemical Formula 1,

M is Co, Cr, or a combination thereof,

1<1.33−0.67x−z<1.2, 0.5<0.67−0.33x−0.5y<0.6, 0.2<x−0.5y+z<0.5, and 0<y<0.13.

The Mn may include both Mn having an oxidation number of +3 and Mn having an oxidation number of +4.

A content (k, wt %) of the Mn having an oxidation number of +3 based on the total amount of the Mn may be represented by Equation 1.

$$k=100z/(0.67-0.33x-0.5y)$$ [Equation 1]

The content of the Mn having an oxidation number of +3 may be greater than about 0 wt % and less than about 37 wt % based on the total amount of the Mn.

The content of the Mn having an oxidation number of +3 may be greater than about 5 wt % and less than about 10 wt %.

In Chemical Formula 1, M may be Co.

In Chemical Formula 1, 1<1.33−0.67x−z<1.15, 0.5<0.67−0.33x−0.5y<0.6, 0.24<x−0.5y+z<0.4, and 0<y<0.13.

In Chemical Formula 1, 0.06<y<0.09.

In Chemical Formula 1, 0.52<0.67−0.33x−0.5y<0.56.

Another embodiment provides the positive electrode including a positive active material.

Yet another embodiment provides a rechargeable lithium battery including the positive electrode including a positive active material, a negative electrode including a negative active material, and an electrolyte.

Other embodiments are included in the following detailed description.

The positive active material according to one embodiment has a composition capable of improving a voltage decrease phenomenon and thus may provide a rechargeable lithium battery having excellent high rate capability and cycle-life characteristics.

DETAILED DESCRIPTION

Hereinafter, embodiments are described in detail. However, these embodiments are examples, and this disclosure is not limited thereto.

A positive active material according to one embodiment is represented by Chemical Formula 1.

$$Li_{(1.33-0.67x-z)}Mn_{(0.67-0.33x-0.5y)}Ni_{(x-0.5y+z)}M_{(y)}O_2 \quad [\text{Chemical Formula 1}]$$

In Chemical Formula 1,
M is Co, Cr, or a combination thereof,
$1 < 1.33 - 0.67x - z < 1.2$, $0.5 < 0.67 - 0.33x - 0.5y < 0.6$, $0.2 < x - 0.5y + z < 0.5$, and $0 < y < 0.13$.

The positive active material having a composition represented by Chemical Formula 1 may be applied to a rechargeable lithium battery for an electric vehicle as a Li-rich layered oxide.

However, the Li-rich layered oxide positive active material generally has a problem of a voltage decrease as a rechargeable lithium battery repeats a cycle. This voltage decrease phenomenon sharply decreases energy density and output density of the rechargeable lithium battery and mainly deteriorates drivable distance and power characteristics of the electric vehicle. In addition, the voltage decrease phenomenon may make it very difficult to predict accurate state of charge (SOC) of the rechargeable lithium battery and thus overcharge the rechargeable lithium battery and thus have an influence on its safety or cause inaccurate calculation of drivable distance of the electric vehicle.

However, a rechargeable lithium battery including the positive active material having a composition represented by Chemical Formula 1 according to one embodiment may improve the voltage decrease phenomenon occurring during the charge and discharge.

For example, in Chemical Formula 1, $1 < 1.33 - 0.67x - z < 1.15$, $0.5 < 0.67 - 0.33x - 0.5y < 0.6$, $0.24 < x - 0.5y + z < 0.4$, and $0 < y < 0.13$.

Specifically, in Chemical Formula 1, the Mn may include both Mn having an oxidation number of +3 and Mn having an oxidation number of +4. A part of the Mn has an oxidation number of +3 and thus may efficiently suppress a voltage decrease according to charges and discharges.

For example, a content (k, wt %) of the Mn having an oxidation number of +3 based on the total amount of the Mn may be represented by Equation 1.

$$k = 100z/(0.67 - 0.33x - 0.5y) \quad [\text{Equation 1}]$$

For example, the content of the Mn having an oxidation number of +3 may be greater than about 0 wt % and less than about 37 wt %, for example greater than about 5 wt % and less than about 10 wt %. When the Mn having an oxidation number of +3 is included within the range, the voltage decrease according to charges and discharges may be efficiently suppressed.

In addition, the rechargeable lithium battery including the positive active material having the above composition improves high rate capability and cycle-life characteristics other than the voltage decrease phenomenon. The electrochemical characteristics of the rechargeable lithium battery may be improved.

For example, in Chemical Formula 1, M may be Co. For example, in Chemical Formula 1, $0.52 < 0.67 - 0.33x - 0.5y < 0.56$, and $0.06 < y < 0.09$. Herein, the positive active material may suppress an electrical conductivity decrease, since $Co^{3+}$ is not changed even though $Ni^{2+}$ is increased in Chemical Formula 1.

The positive active material may be prepared in various methods, for example, a solid reaction, known in a related art without a particular limit.

Another embodiment provides a positive electrode including the positive active material.

Another embodiment provides a rechargeable lithium battery including the positive electrode, a negative electrode including a negative active material, and an electrolyte.

Figure 1:
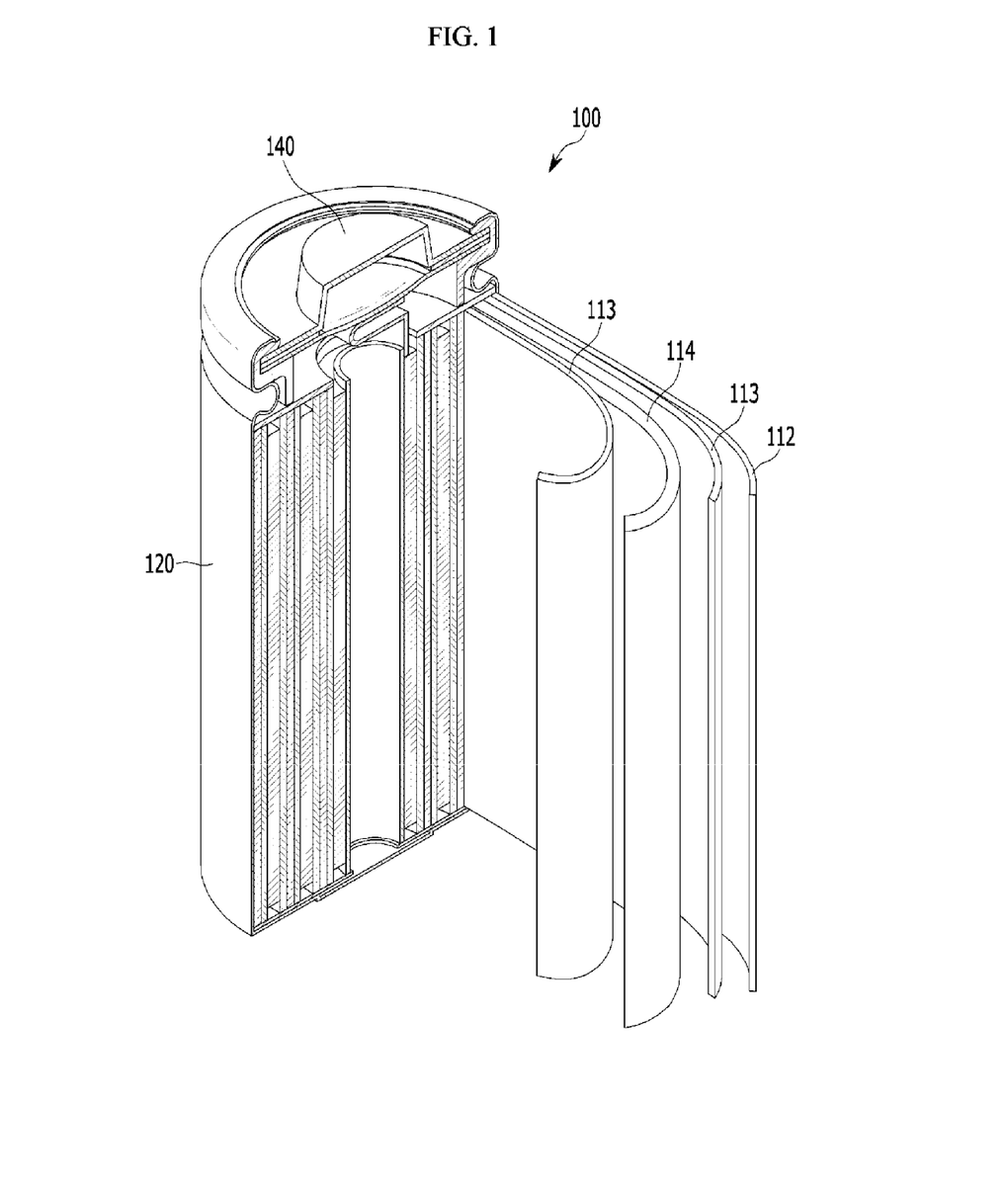
FIG. 1 is a schematic view showing a rechargeable lithium battery according to one embodiment.

The rechargeable lithium battery is described referring to FIG. 1.

FIG. 1 is a schematic view showing a rechargeable lithium battery according to one embodiment.

Referring to FIG. 1, a rechargeable lithium battery 100 according to one embodiment includes an electrode assembly including a positive electrode 114, a negative electrode 112 facing the positive electrode 114, and a separator 113 interposed between the negative electrode 112 and the positive electrode 114, a battery case 120 including the electrode assembly, an electrolyte solution (not shown), and a sealing member 140 sealing the battery case 120.

The negative electrode includes a current collector and a negative active material layer disposed on the current collector, and the negative active material layer includes a negative active material.

The negative active material may be a silicon-based negative active material, a carbon-based negative active material, or a combination thereof.

The silicon-based negative active material may include at least one selected from silicon (Si), silicon oxide, silicon oxide coated with conductive carbon on the surface, and silicon (Si) coated with conductive carbon on the surface. For example the negative active material may be represented by Chemical Formula 2.

$$SiO_x \quad [\text{Chemical Formula 2}]$$

In Chemical Formula 2,
$0.95 \leq x \leq 1.1$.

The carbon-based negative active material may include graphite.

If the negative active material includes the silicon-based negative active material and the carbon-based negative active material, the weight ratio of the compound represented by Chemical Formula 2 and the carbon-based negative active material may be about 3:97 to about 10:90, for example about 3:97 to about 5:95. Herein, cycle-life characteristics may be remarkably improved. When the compound represented by Chemical Formula 2 is included in an amount of greater than about 10 wt % based on the total weight of the compound represented by Chemical Formula 2 and the carbon-based negative active material, irreversibility of the $SiO_x$ is increased, and thus, battery capacity is deteriorated.

The negative active material layer includes a binder, and optionally a conductive material.

The binder improves binding properties of negative active material particles with one another and with a current collector. The binder may be a non-aqueous binder, an aqueous binder, or a combination thereof.

The non-aqueous binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The aqueous binder may be a rubber-based binder or a polymer resin binder.

The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and a combination thereof.

The polymer resin binder may be selected from polyethylene, polypropylene, ethylenepropylene copolymer, polyethyleneoxide, polyvinylpyrrolidone, epichlorohydrin, polyphosphazene, polyacrylonitrile, polystyrene, ethylenepropylenediene copolymer, polyvinylpyridine, chlorosulfonated polyethylene, latex, a polyester resin, an acrylic resin, a phenolic resin, an epoxy resin, polyvinyl alcohol and a combination thereof.

When the aqueous binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkali metal salts thereof. The alkali metal may be Na, K, or Li. Such a thickener may be included in an amount of about 0.1 parts by weight to about 3 parts by weight based on 100 parts by weight of the negative active material.

The conductive material improves electrical conductivity of an electrode. Any electrically conductive material may be used as a conductive material, unless it causes a chemical change. Examples thereof may be a carbon-based material such as natural graphite, artificial graphite, carbon black, acetylene black, ketjen black, a carbon fiber, and the like; a metal-based material such as a metal powder or a metal fiber and the like of copper, nickel, aluminum, silver, and the like; a conductive polymer such as a polyphenylene derivative and the like; or a mixture thereof.

The current collector may include a copper foil, a nickel foil, a stainless steel foil, a titanium foil, a nickel foam, a copper foam, a polymer substrate coated with a conductive metal, or a combination thereof.

The positive electrode includes a current collector and a positive active material layer disposed on the current collector, and the positive active material layer includes the positive active material represented by Chemical Formula 1.

The positive active material layer includes a binder and a conductive material.

The binder improves binding properties of positive active material particles with one another and with a current collector. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material provides an electrode with conductivity. Any electrically conductive material may be used as a conductive material unless it causes a chemical change. Examples of the conductive material include: one or more of natural graphite, artificial graphite, carbon black, acetylene black, ketjen black, a carbon fiber, copper, a metal powder or a metal fiber including nickel, aluminum, silver, and the like, and a polyphenylene derivative.

The current collector may use Al but is not limited thereto.

The negative electrode and the positive electrode may be respectively manufactured by a method including mixing an active material, a conductive material, and a binder in a solvent into an active material composition and coating the composition on a current collector. The electrode manufacturing method is well known and thus is not described in detail in the present specification. The solvent includes N-methylpyrrolidone and the like but is not limited thereto.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent may include methyl acetate, ethyl acetate, n-propyl acetate, methylpropionate, ethylpropionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran, and the like, and the ketone-based solvent may include cyclohexanone, and the like. The alcohol-based solvent include ethyl alcohol, isopropyl alcohol, and the like, and examples of the aprotic solvent include nitriles such as R—CN (where R is a $C_2$ to $C_{20}$ linear, branched, or cyclic hydrocarbon that may include a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio may be controlled in accordance with a desirable battery performance.

The carbonate-based solvent is prepared by mixing a cyclic carbonate and a linear carbonate. The cyclic carbonate and the linear carbonate are mixed together in the volume ratio of about 1:1 to about 1:9. Within this range, performance of electrolyte may be improved.

The non-aqueous organic electrolyte may be further prepared by mixing a carbonate-based solvent with an aromatic hydrocarbon-based solvent. The carbonate-based and the aromatic hydrocarbon-based solvents may be mixed together in a volume ratio ranging from about 1:1 to about 30:1.

The aromatic hydrocarbon-based organic solvent may be an aromatic hydrocarbon-based compound represented by Chemical Formula 3.

[Chemical Formula 3]

In Chemical Formula 3, $R_1$ to $R_6$ are independently hydrogen, halogen, a C1 to C10 alkyl group, a C1 to C10 haloalkyl group, or a combination thereof.

The aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate or an ethylene carbonate-based compound represented by Chemical Formula 4 to improve battery cycle-life.

[Chemical Formula 4]

In Chemical Formula 4, $R_7$ and $R_8$ are independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group.

The ethylene carbonate-based compound includes difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the vinylene carbonate or the ethylene carbonate-based compound used to improve cycle life may be adjusted within an appropriate range.

The lithium salt is dissolved in the non-aqueous organic solvent, supplies lithium ions in a battery, basically operates the rechargeable lithium battery, and improves lithium ion transportation between positive and negative electrodes therein. Specific examples of the lithium salt may include at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_nF_{2n+1}SO_2)(C_mF_{2m+1}SO_2)$, wherein, n and m are natural numbers, e.g., an integer of 1 to 20), LiCl, LiI, LiB$(C_2O_4)_2$ (lithium bis(oxalato) borate; LiBOB), or a combination thereof. The lithium salt may be used in a concentration ranging from about 0.1 M to about 2.0 M. When the lithium salt is included at the concentration range, an electrolyte may have excellent electrolyte performance and lithium ion mobility due to optimal conductivity and viscosity.

The separator 113 may include any materials commonly used in the conventional lithium battery as long as separating the negative electrode 112 from the positive electrode 114 and providing a transporting passage for lithium ion. The separator may have a low resistance to ion transportation and an excellent impregnation for an electrolyte. For example, it may be selected from glass fiber, polyester, Teflon, polyethylene, polypropylene, polytetrafluoroethylene (PTFE), or a combination thereof. It may have a form of a non-woven fabric or a woven fabric. For example, a polyolefin-based polymer separator such as polyethylene, polypropylene or the like is mainly used for a lithium ion battery. In order to ensure the heat resistance or mechanical strength, a coated separator including a ceramic component or a polymer material may be used. Selectively, it may have a mono-layered or multi-layered structure.

Hereinafter, the embodiments are illustrated in more detail with reference to examples. However, these are examples, and the present disclosure is not limited thereto.

EXAMPLES

Preparation of Positive Active Material

Example 1

A positive active material having a composition of $Li_{1.10}Mn_{0.54}Ni_{0.28}Co_{0.08}O_2$ (including 9.25 wt % of Mn having an oxidation number of +3 based on the total amount of the Mn) was synthesized by mixing a $Mn_{0.60}Ni_{0.31}Co_{0.09}(OH)_2$ hydroxide precursor having a ratio among Mn:Ni:Co=0.54:0.28:0.08 and lithium carbonate required in a final composition and firing the mixture at 700° C.

Example 2

A positive active material having a composition of $Li_{1.12}Mn_{0.54}Ni_{0.26}Co_{0.08}O_2$ (including 5.55 wt % of Mn having an oxidation number of +3 based on the total amount of the Mn) was synthesized by mixing a $Mn_{0.61}Ni_{0.30}Co_{0.09}(OH)_2$ hydroxide precursor having a ratio among Mn:Ni:Co=0.54:0.26:0.08 and lithium carbonate required in a final composition and firing the mixture at 700° C.

Comparative Example 1

A positive active material having a composition of $Li_{1.15}Mn_{0.54}Ni_{0.23}Co_{0.08}O_2$ (including no Mn having an oxidation number of +3 based on the total amount of the Mn) was synthesized by mixing a $Mn_{0.64}Ni_{0.27}CO_{0.09}(OH)_2$ hydroxide precursor having a ratio among Mn:Ni:Co=0.54:0.23:0.08 and lithium carbonate required in a final composition and firing the mixture at 700° C.

Comparative Example 2

A positive active material having a composition of $Li_{1.17}Mn_{0.54}Ni_{0.21}Co_{0.08}O_2$ (including no Mn having an oxidation number of +3 based on the total amount of the Mn) was synthesized by mixing a $Mn_{0.65}Ni_{0.25}CO_{0.10}(OH)_2$ hydroxide precursor having a ratio among Mn:Ni:Co=0.54:0.21:0.08 and lithium carbonate required in a final composition and firing the mixture at 700° C.

Manufacture of Rechargeable Lithium Battery Cell

Example 3

The positive active material according to Example 1, polyvinylidene fluoride (Solef©6020) as a binder, carbon black (Denka Co. Ltd.) as a conductive material, and NMP (n-methyl-2-pyrrolidone) as a mixing solvent were mixed in a weight ratio of 96:2:2 to prepare slurry, and the slurry was coated on a 12 μm-thick aluminum current collector. The coated slurry was dried and compressed, manufacturing a positive electrode.

The positive electrode and a lithium counter electrode were used to manufacture a coin half cell.

Herein, an electrolyte solution was prepared by mixing 1.3 M LiPF$_6$ and a mixture of ethylenecarbonate (EC)/diethylcarbonate (DEC)/propylpropionate (PP).

Example 4

A coin half cell was manufactured according to the same method as Example 3 except for using the positive active material according to Example 2 instead of the positive active material according to Example 1.

Example 5

The positive active material according to Example 1, polyvinylidene fluoride (Solef©6020) as a binder, carbon black (Denka Co. Ltd.) as a conductive material, and NMP (n-methyl-2-pyrrolidone) as a mixing solvent were mixed in a weight ratio of 96:2:2 to prepare slurry, and the slurry was coated on a 12 μm-thick aluminum current collector. The coated slurry was dried and compressed, manufacturing a positive electrode.

Graphite powder (Mitsubishi Chemical Corporation) as a negative active material, a carboxylmethyl cellulose (CMC) binder and a styrene butadiene rubber (SBR)-based binder, and water as a mixing solvent were used in a weight ratio of 97.5:1.5:1 among the negative active material:CMC:SBR to prepare slurry, and the slurry was coated on a 12 μm-thick copper current collector. The coated slurry was dried and compressed like the positive electrode, manufacturing a negative electrode.

The positive and negative electrodes were used to manufacture a full cell.

Herein, an electrolyte solution was prepared by mixing 1.3 M LiPF$_6$ and a mixture of ethylenecarbonate (EC)/diethylcarbonate (DEC)/propylpropionate (PP).

Example 6

A rechargeable lithium battery cell was manufactured according to the same method as Example 5 except for using the positive active material according to Example 2 instead of the positive active material according to Example 1.

Comparative Example 3

A coin half cell was manufactured according to the same method as Example 3 except for using the positive active material according to Comparative Example 1 instead of the positive active material according to Example 1.

Comparative Example 4

A coin half cell was manufactured according to the same method as Example 3 except for using the positive active material according to Comparative Example 2 instead of the positive active material according to Example 1.

Comparative Example 5

A rechargeable lithium battery cell was manufactured according to the same method as Example 5 except for using the positive active material according to Comparative Example 1 instead of the positive active material according to Example 1.

Comparative Example 6

A rechargeable lithium battery cell was manufactured according to the same method as Example 5 except for using the positive active material according to Comparative Example 2 instead of the positive active material according to Example 1.

Experimental Example: Battery Cell Evaluation

A coin half cell was CC-CV charged at 0.1 C and 4.7 V and discharged at 0.1 C and 2.5 V, evaluating battery performance. A 18650 full cell was CC-CV charged at 0.1 C and 4.55 V and discharged at 0.1 C and 2.0 V, evaluating battery performance. The cycle-life of the 18650 full cell was evaluated by CC-CV charging it at 1 C and 4.55 V and discharging it at 1 C and 2.0 V.

Figure 2:
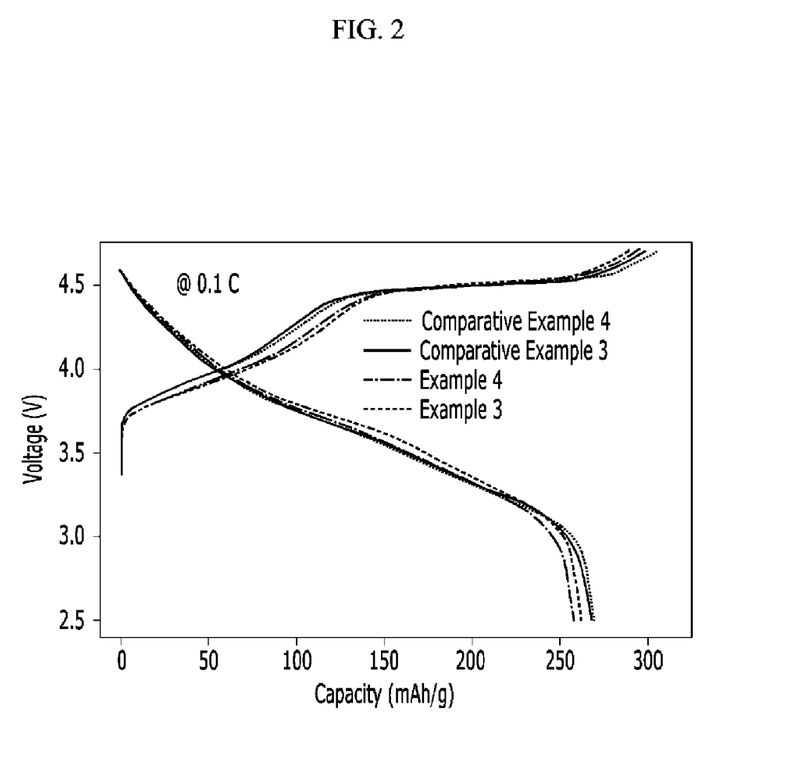
FIG. 2 is a graph showing the voltage changes of half-cells including each positive active material according to Examples 1 and 2 and Comparative Examples 1 and 2 depending on capacity (the first cycles of the coin half-cells at 0.1 C).
Figure 3:
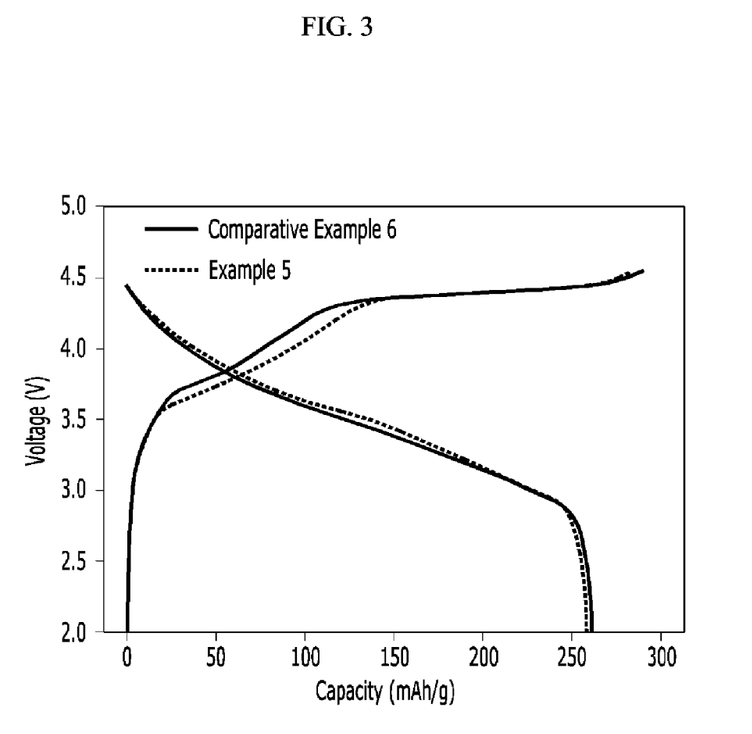
FIG. 3 is a graph showing the voltage changes of rechargeable lithium battery cells including each positive active material according to Example 1 and Comparative Example 2 depending on capacity (the first cycle of the 18650 full cells at 0.1 C).
Figure 4:
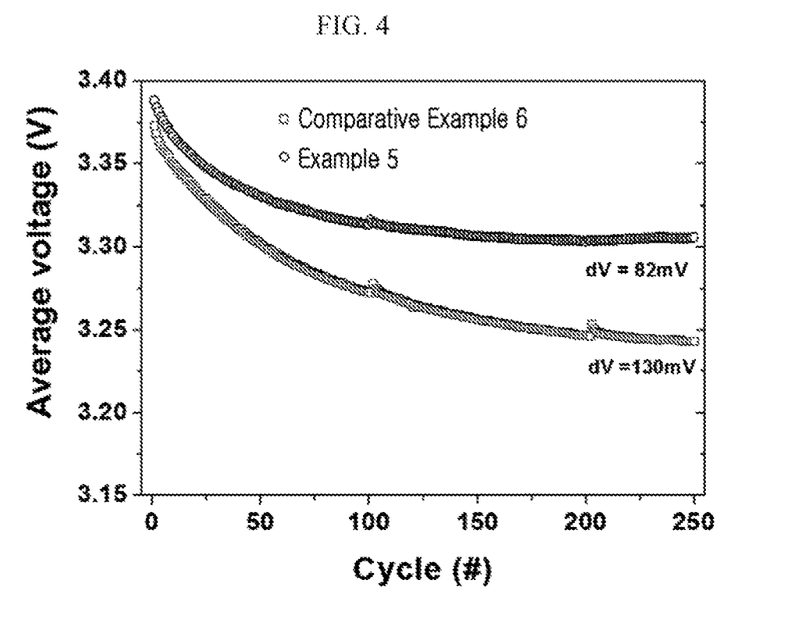
FIG. 4 is a graph showing the average voltage changes of the rechargeable lithium battery cells including each positive active material according to Example 1 and Comparative Example 2 depending on a cycle (the average voltage of the 18650 full cells at 0.1 C).
Figure 5:
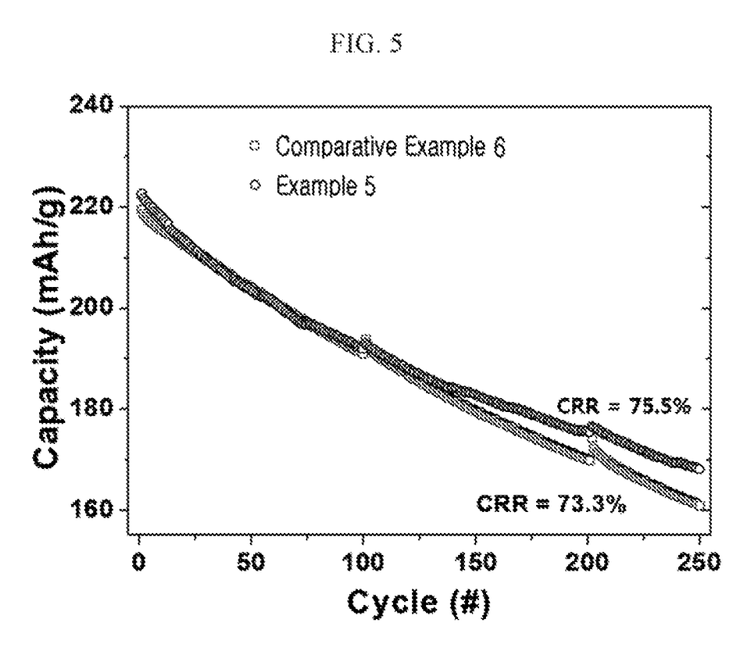
FIG. 5 is a graph showing the capacity changes of the rechargeable lithium battery cells including each positive active material according to Example 1 and Comparative Example 2 depending on a cycle (0.1 C cycle of the 18650 full cells).

The evaluation results of the cells according to Examples 3 and 4 and Comparative Examples 3 and 4 were provided in FIG. 2 and the evaluation results of the cells according to Example 5 and Comparative Example 6 were provided in FIGS. 3 to 5. In FIG. 5, CRR refers to Capacity Retention Rate.

Referring to FIGS. 2 to 5, the cell including a positive active material having a composition represented by Chemical Formula 1 and Mn's having oxidation numbers of +3 and +4 according to Examples 3, 4, and 5 showed a small voltage decrease change and excellent cycle-life characteristics compared with the rechargeable lithium battery cells having a different composition from that of Chemical Formula 1 and including no Mn's having oxidation numbers of +3 according to Comparative Examples 3, 4, and 6.

While this disclosure has been described in connection with what is presently considered to be practical example embodiments, it is to be understood that the present embodiments are not limited to the disclosed embodiments, but, on the contrary, are intended to cover various modifications and equivalent arrangements included within the spirit and scope of the appended claims.

What is claimed is:

1. A positive active material comprising a compound represented by Chemical Formula 1:

$$Li_{(1.33-0.67x-z)}Mn_{(0.67-0.33x-0.5y)}Ni_{(x-0.5y+z)}M_{(y)}O_2 \quad \text{[Chemical Formula 1]}$$

wherein the M is Co, Cr, or a combination thereof, and wherein the $Li_{(1.33-0.67x-z)}Mn_{(0.67-0.33x-0.5y)}Ni_{(x-0.5y+z)}M_{(y)}O_2$ comprises, on the basis of a total relative atomic amount of oxygen (O) being 2 and a total relative atomic amount of a combination of the Li, Mn, Ni and M being 2 in the Chemical Formula 1:

the M at an amount represented by the (y), wherein the y has a value greater than 0 and less than 0.13, the Mn at an amount represented by the (0.67−0.33x−0.5y), wherein the x and y have values such that the amount of Mn is greater than 0.5 and less than 0.6, the Li at an amount represented by the (1.33−0.67x−z), wherein the x and z have values such that the amount of Li is greater than 1 and less than 1.2, and the Ni at an amount represented by the (x−0.5y+z), wherein the x, y and z have values such that the amount of Ni is greater than 0.2 and less than 0.5.

2. The positive active material of claim 1, wherein the Mn comprises Mn having an oxidation number of +3 and Mn having an oxidation number of +4.

3. The positive active material of claim 2, wherein a content (k, wt %) of the Mn having an oxidation number of +3 based on the total amount of the Mn is represented by Equation 1:

$$k=100z/(0.67-0.33x-0.5y). \quad \text{[Equation 1]}$$

4. The positive active material of claim 2, wherein the content of the Mn having an oxidation number of +3 is greater than about 0 wt % and less than about 37 wt %.

5. The positive active material of claim 2, wherein the content of the Mn having an oxidation number of +3 is greater than about 5 wt % and less than about 10 wt %.

6. The positive active material of claim 1, wherein in Chemical Formula 1, M is Co.

7. The positive active material of claim 1, wherein in Chemical Formula 1, $1<1.33-0.67x-z<1.15$, $0.5<0.67-0.33x-0.5y<0.6$, $0.24<x-0.5y+z<0.4$, and $0<y<0.13$.

8. The positive active material of claim 1, wherein in Chemical Formula 1, $0.06<y<0.09$.

9. The positive active material of claim 8, wherein in Chemical Formula 1, $0.52<0.67-0.33x-0.5y<0.56$.

10. A positive electrode including a positive active material comprising a compound represented by Chemical Formula 1:

[Chemical Formula 1]

wherein,
M is Co, Cr, or a combination thereof,
$1<1.33-0.67x-z<1.2$, $0.5<0.67-0.33x-0.5y<0.6$, $0.2<x-0.5y+z<0.5$, and $0<y<0.13$.

11. A rechargeable lithium battery comprising
a positive electrode comprising:
a compound represented by Chemical Formula 1:

[Chemical Formula 1]

wherein M is Co, Cr, or a combination thereof, and
wherein the $Li_{(1.33-0.67x-z)}Mn_{(0.67-0.33x-0.5y)}Ni_{(x-0.5y+z)}M_{(y)}O_2$ comprises, on the basis of a total relative atomic amount of oxygen (O) being 2 and a total relative atomic amount of a combination of the Li, Mn, Ni and M being 2 in the Chemical Formula 1:
the M at an amount represented by the (y), wherein the y has a value greater than 0 and less than 0.13,
Mn at an amount represented by the (0.67−0.33x−0.5y), wherein the x and y have values such that the amount of Mn is greater than 0.5 and less than 0.6,
Li at an amount represented by the (1.33−0.67x−z), wherein the x and z have values such that the amount of Li is greater than 1 and less than 1.2, and
Ni at an amount represented by the (x−0.5y+z), wherein the x, y and z have values such that the amount of Ni is greater than 0.2 and less than 0.5;
a negative electrode including a negative active material, and
an electrolyte.

12. The rechargeable lithium battery of claim 11, wherein the Mn comprises Mn having an oxidation number of +3 and Mn having an oxidation number of +4.

13. The rechargeable lithium battery of claim 11, wherein a content (k, wt %) of the Mn having an oxidation number of +3 based on the total amount of the Mn is represented by Equation 1:

$k=100z/(0.67-0.33x-0.5y)$  [Equation 1].

14. The rechargeable lithium battery of claim 13, wherein the content of the Mn having an oxidation number of +3 is greater than about 0 wt % and less than about 37 wt %.

15. The rechargeable lithium battery of claim 13, wherein the content of the Mn having an oxidation number of +3 is greater than about 5 wt % and less than about 10 wt %.

16. The rechargeable lithium battery of claim 11, wherein in Chemical Formula 1, M is Co.

17. The rechargeable lithium battery of claim 11, wherein in Chemical Formula 1, $1<1.33-0.67x-z<1.15$, $0.5<0.67-0.33x-0.5y<0.6$, $0.24<x-0.5y+z<0.4$, and $0<y<0.13$.

18. The rechargeable lithium battery of claim 11, wherein in Chemical Formula 1, $0.06<y<0.09$.

19. The rechargeable lithium battery of claim 11, wherein in Chemical Formula 1, $0.52<0.67-0.33x-0.5y<0.56$.

* * * * *

UNITED STATES PATENT AND TRADEMARK OFFICE
CERTIFICATE OF CORRECTION

PATENT NO. : 10,283,771 B2  
APPLICATION NO. : 15/349939  
DATED : May 7, 2019  
INVENTOR(S) : Eun-Sung Lee et al.

Page 1 of 1

It is certified that error appears in the above-identified patent and that said Letters Patent is hereby corrected as shown below:

In the Specification

In Column 1, Line 10 (Approx.), change "reference", to --reference.--.

In Column 1, Lines 42-43, change "$LiNi_{1/3}Mn_{1/3}CO_{1/3}O_2$,", to --$LiNi_{1/3}Mn_{1/3}Co_{1/3}O_2$,--.

In Column 5, Line 18, change "carboxylmethyl", to --carboxymethyl--.

In Column 5, Lines 46-47, change "carboxylmethyl", to --carboxymethyl--.

In Column 8, Line 39, change "$Mn_{0.64}Ni_{0.27}CO_{0.09}(OH)_2$", to --$Mn_{0.64}Ni_{0.27}Co_{0.09}(OH)_2$--.

In Column 8, Line 49, change "$Mn_{0.65}Ni_{0.25}CO_{0.10}(OH)_2$", to --$Mn_{0.65}Ni_{0.25}Co_{0.10}(OH)_2$--.

In Column 9, Line 22, change "carboxylmethyl", to --carboxymethyl--.

In the Claims

In Column 10, Line 41 (Approx.), Claim 1, change "$M_{(y)}O_2$", to --$M_{(y)}O_2$,--.

In Column 11, Line 31 (Approx.), Claim 11, change "$M_{(y)}O_2$", to --$M_{(y)}O_2$,--.

Signed and Sealed this  
Ninth Day of June, 2020

Andrei Iancu  
*Director of the United States Patent and Trademark Office*